United States Patent [19]

Lane

[11] Patent Number: 4,942,845
[45] Date of Patent: Jul. 24, 1990

[54] BIRDFEEDER ATTACHABLE TO A MAILBOX

[76] Inventor: Fred J. Lane, 1475 E. McDaniel, Springfield, Mo. 65802

[21] Appl. No.: 408,368

[22] Filed: Sep. 18, 1989

[51] Int. Cl.$^5$ ............................................. A01K 39/014
[52] U.S. Cl. ..................................... 119/52.2; 119/61
[58] Field of Search ....................... 119/52.2, 52.3, 61, 119/57.8, 57.9

[56] References Cited

U.S. PATENT DOCUMENTS

| | | | |
|---|---|---|---|
| 1,602,670 | 10/1926 | Hartman | 119/61 |
| 1,895,435 | 1/1933 | Ahrens | 119/52.1 |
| 2,195,575 | 4/1940 | Mallgraf | 119/52.2 |
| 2,365,498 | 12/1944 | Specketer | 119/61 |
| 2,944,516 | 7/1960 | Malloy, Sr. | 119/52.8 |
| 3,022,768 | 2/1962 | Lynch | 119/52.3 |
| 3,077,863 | 2/1963 | Chilovich | 119/57.8 |
| 3,295,498 | 1/1967 | Brown | 119/52.2 |
| 3,661,121 | 5/1972 | Zielin | 119/61 |
| 4,167,917 | 9/1979 | Noll | 119/57.9 |
| 4,215,652 | 8/1980 | Kerscher | 119/57.8 |
| 4,281,624 | 8/1981 | Raines | 119/52.1 |
| 4,574,738 | 3/1986 | Tominaga | 119/52.2 |

*Primary Examiner*—Paul J. Hirsch
*Attorney, Agent, or Firm*—Richard C. Litman

[57] ABSTRACT

A birdfeeder mounted on either side of a conventional mailbox. The birdfeeder comprises two separate equal halves including feed hoppers disposed on opposite sides of a mailbox. Below each hopper is a feeding tray and a perch for the birds to feed. The placement of the feeder sections on either side of the mailbox allows normal usage of the mailbox for delivery and collection of the mail. One method of affixing the sections includes using tongues on the rear of the hoppers that slip into brackets on the mailbox sides to attach the separate sections to the mailbox sides. Another method includes the use of a strap that allows the birdfeeder to hang over the mailbox.

8 Claims, 1 Drawing Sheet

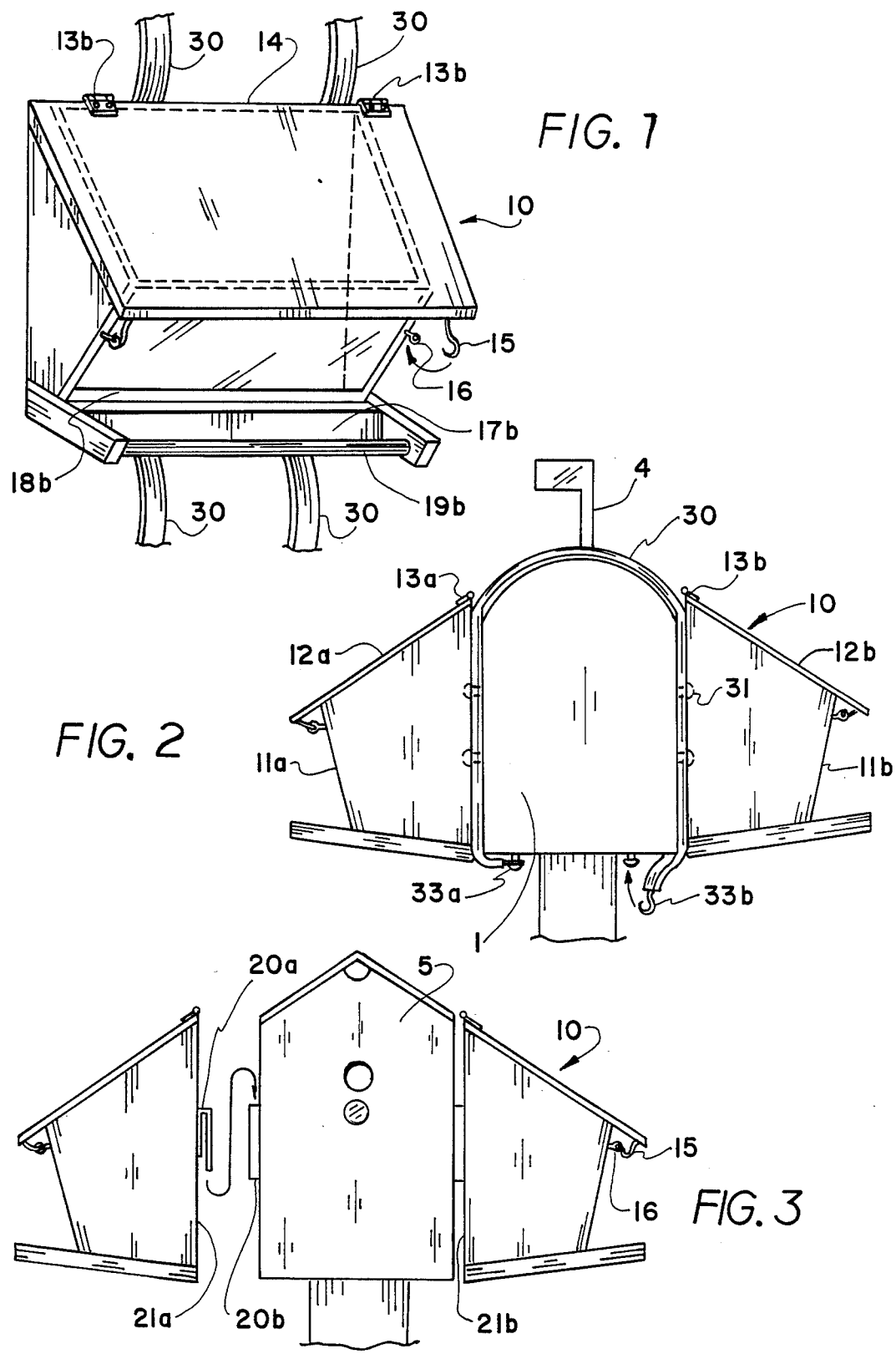

BIRDFEEDER ATTACHABLE TO A MAILBOX

BACKGROUND OF THE INVENTION

1. Field of the Invention

The present invention relates to innovations in the field of animal feeding devices. More particularly it relates to a new type of birdfeeder. A novel type of portable birdfeeder is disclosed that can be easily and quickly attached to any standard mailbox or similar structure such as a birdhouse. The inclusion of this device allows for added enjoyment to the dull task of getting the mail every day.

2. Description of the Prior Art

The following is a discussion of patents felt to be vaguely related to the present invention, but in no way disclosing the present invention, whether singly or in combination.

U.S. Pat. Nos. 3,706,411 and 3,030,058 issued respectively to Klein and Rosing disclose rural mailboxes with additional shelves for newspapers attached to the side or bottom thereof.

U.S. Design Pat. Nos. 192,925 and 278,169 issued respectively to Kofsky et al. and Cargile, Jr. disclose ornamental designs of bird feeders with open shelves.

None of the above prior art patents discloses a bird feeder which can be affixed to a mailbox or the like. None of the above references disclose using the applicant's unique method of securing the birdfeeder to a standing structure.

SUMMARY OF THE INVENTION

The present invention comprises a birdfeeder divided into two separate equal parts and placed on opposite sides of a mailbox. The present disclosure discusses a couple methods of accomplishing this. One method is to physically attach two equal birdfeeder halves on either side of a mailbox with bolts or screws. The other disclosed method is to again divide the birdhouse into two equal halves, but to use a strap on attachment device. This method of attachment allows for easy installment and removal of the birdfeeder around the mailbox.

The halves of the birdfeeder would have top covers that would open up, allowing for the filling of the hoppers with birdseed or similar bird feed. The separate halves would also be equipped with separate perches for the animals that would be feeding at the site. The route number and name of the owner of the household can be placed on the top covers so as to be easily visible by the mailman as he makes his or her rounds. The placement of the birdfeeder halves on the sides of the mailbox allows for free and unhindered access to the mailbox.

Accordingly, it is one object of the present invention to provide a birdfeeder that is attachable to a conventional mailbox.

It is another object of the present invention to provide a birdfeeder having separate and equal halves placed on either side of a mailbox.

It is still another object of the present invention to provide a birdfeeder that can be attached to a conventional mailbox by means of a strap arrangement.

It is yet another object of the present invention to provide a birdfeeder that can be attached to a conventional mailbox and that does not interfere with the delivery and collection of the mail.

It is a further object of the present invention to provide a birdfeeder that provides diversion from the usual task of collection the daily mail.

These and other objects of the present invention will become readily apparent upon further review of the following detailed specification and attached drawings.

BRIEF DESCRIPTION OF THE DRAWINGS

FIG. 1 depicts a perspective view of the birdfeeder.

FIG. 2 depicts a perspective view of the birdfeeder that uses a strap arrangement to attach it to the mailbox.

FIG. 3 depicts an exploded view in perspective of the birdfeeder using a bracket arrangement to mount it.

Similar reference characters denote corresponding features throughout the drawings.

A DETAILED DESCRIPTION OF THE PREFERRED EMBODIMENT

The present invention 10 shown in FIG. 1 firstly comprises two separate, equally sized hoppers 11a, 11b made of a clear material such as plexiglass having top covers 12a, 12b. The top covers 12a, 12b are hinged to open and close by hinges 13a, 13b along the outer edge 14. Covers 12a, 12b are slanted downward to let rain run off into the ground below. Notice that the covers 12a, 12b overhang beyond the edge of the feeding trays 17a, 17b. This keeps the feeding trays 17a, 17b dry. Opening the covers 12a, 12b allows the hoppers 11a, 11b to be filled with birdseed and the like. The covers 12a, 12b would have hooked latches 15 that would go through eyelets 16 to lock the covers 12a, 12b closed when the hoppers 11a, 11b have been filled.

Below each hopper 11a, 11b is a feeding tray 17a, 17b, as described above, also made of plexiglass that would contain birdseed that would drain out through feed apertures 18a, 18b from the hoppers 11a, 11b. Attached to each feeding tray 17a, 17b is a perch 19a, 19b allowing birds to alight on the feeder 10 to feed from the trays 17a, 17b. The perches 19a, 19b are also underneath the overhang of the hopper covers 12a, 12b so that the birds can use the perches as a shelter.

Each separate half 10a, 10b is attached to an opposite side of the mailbox 1 or birdhouse 5. In FIG. 3 the birdfeeder 10 is attached by slipping a tongue 20a mounted to the rear side 21a, 21b of the hopper into a corresponding bracket 20b on the mailbox 1 or birdhouse 5 in order to mount each separate half 10a, 10b to the sides of the mailbox 1. This tongue and bracket mounting system allows for easy removal of each birdfeeder section 10a, 10b for cleaning. By applying each half 10a, 10b to separate sides of the mailbox 1 or birdhouse 5 the main lid of the mailbox 1 is left free for the delivery and collection of the day's mail. The route number and name of the recipient can be marked on the top surface of the hinged hopper covers 12a, 12b to give clear identification of the owners.

FIG. 2 shows an alternate method of attaching the separate halves 10a, 10b of the birdfeeder 10. Instead of using the tongue 20a and bracket 20b to mount the birdfeeder 10 as with the previous example, straps 30 are used to allow the birdfeeder halves 10a, 10b to hang over the top of the mailbox 1. The straps 30 connect the two halves 10a, 10b at points on the rear face 21a, 21b of each half 10a, 10b. Rivets 31 go through the straps 30 and the rear faces 21a, 21b. The ends of the straps 32 shown more closely in FIG. 2 have clasps 33a, 33b that serve to secure and tighten the straps 30 with the birdfeeder halves 10a, 10b onto the mailbox 1.

The straps 30 can be constructed of plastic having thin steel cables embedded in them to add strength. Other materials such as leather or woven synthetic material such as Nylon can also be used to construct the straps 30. It is desirable to have the straps 30 made from a material that can withstand the elements without deteriorating. These birdfeeders 10 can be applied to other structures besides the mailbox described herein, such as fence cross-spans or a birdhouse.

In both of these embodiments it is necessary to displace the mailbox flag 4 from its usual position in order to make room for the birdfeeder 10. In each case the flag 4 can be removed and placed on the rear end of the mailbox 1 that is opposite the lid.

It is to be understood that the present invention is not limited to the sole embodiment described above, but encompasses any and all embodiments within the scope of the following claims.

I claim:

1. A birdfeeder for attachment to a hollow enclosure including:
   a hollow enclosure for mounting said birdfeeder upon;
   two hoppers to contain animal feed, each said hopper having a rear face mounted adjacent and abutting an opposite side each of said hollow enclosure;
   a cover disposed over each said hopper that is displaceable to reveal the interior of said hopper;
   a feeding tray disposed below each said hopper;
   feeding apertures disposed in a lower portion of each of said hoppers over said feeding trays to allow animal feed to flow out of said hoppers into said feeding trays;
   a perch adjacent each said feeding tray to allow animals such as birds to alight and feed from said feeding trays; and
   at least one flexible mounting strap having the rear face of each said hopper mounted to it such that said rear faces face each other and said at least one strap is mounted over the top of said hollow enclosure with the at least one mounting strap and said rear faces abutting opposite sides of said hollow enclosure.

2. The birdfeeder according to claim 1, wherein:
said opposite sides of said hollow enclosure are the elongated sides of a conventional mailbox.

3. The birdfeeder according to claim 1, wherein:
said covers have a downward slant.

4. The birdfeeder according to claim 3, wherein:
said covers overhang said feeding trays and said perches.

5. The birdfeeder according to claim 1, wherein:
said covers are hinged at points adjacent said sides of said hollow enclosure.

6. The birdfeeder according to claim 1, wherein:
said covers have latch means to lock said covers closed over said hoppers.

7. The birdfeeder according to claim 1, wherein:
said hoppers are mounted to said at least one strap by rivets.

8. The birdfeeder according to claim 1, wherein:
said at least one strap has opposed terminal ends, said terminal ends have a clasp means disposed thereon to secure said birdfeeder onto said mailbox.

* * * * *